United States Patent
Sinclair et al.

(10) Patent No.: US 6,866,711 B2
(45) Date of Patent: Mar. 15, 2005

(54) COMPOSITE PIGMENT COMPOSITION CONTAINING SILICA

(76) Inventors: Fitzgerald Alphanso Sinclair, 326 Brandon Dr., Bear, DE (US) 21078; Mark Edward Wozniak, 1103 Andreas Dr., Bel Air, MD (US) 21015; Louis Frank Gatti, 5 Kelty Ct., Newark, DE (US) 19702; William C. Fultz, 1114 Telegraph Rd., Rising Sun, MD (US) 21911

(*) Notice: Subject to any disclaimer, the term of this patent is extended or adjusted under 35 U.S.C. 154(b) by 207 days.

(21) Appl. No.: 10/346,251

(22) Filed: Jan. 17, 2003

(65) Prior Publication Data

US 2004/0139890 A1 Jul. 22, 2004

(51) Int. Cl.[7] ................................................ C09C 1/02
(52) U.S. Cl. .................... 106/461; 106/400; 106/431; 106/434; 106/435; 106/446; 106/454; 106/475; 106/485; 428/402; 428/403; 524/494; 524/493
(58) Field of Search ................................ 106/400, 431, 106/434, 435, 446, 454, 461, 475, 485, 481; 428/402, 403; 524/494, 493

(56) References Cited

U.S. PATENT DOCUMENTS

| | | |
|---|---|---|
| 4,334,933 A | 6/1982 | Abe et al. |
| 4,551,497 A | 11/1985 | Shinozuka et al. |
| 5,100,947 A | 3/1992 | Puydak et al. |
| 5,227,425 A | 7/1993 | Rauline |
| 5,298,328 A | 3/1994 | Abe et al. |
| 5,340,393 A * | 8/1994 | Jacobson ............... 106/492 |
| 5,891,949 A | 4/1999 | Evans et al. |
| 5,929,156 A | 7/1999 | Fultz et al. |
| 6,008,295 A | 12/1999 | Takeichi et al. |
| 6,054,220 A | 4/2000 | Mroz |
| 6,087,435 A | 7/2000 | Nakano et al. |
| 6,093,768 A | 7/2000 | Nakano et al. |
| 6,180,710 B1 | 1/2001 | Hergenrother et al. |
| 6,194,070 B1 | 2/2001 | Lynch et al. |
| 6,274,662 B1 | 8/2001 | Lynch et al. |
| 6,380,294 B1 | 4/2002 | Babinec et al. |
| 6,413,638 B1 | 7/2002 | Mager et al. |
| 2002/0107316 A1 | 8/2002 | Bice et al. |
| 2002/0115747 A1 | 8/2002 | Feldheim et al. |
| 2002/0128370 A1 | 9/2002 | Colvin et al. |
| 2002/0143096 A1 | 10/2002 | Amaddeo et al. |

FOREIGN PATENT DOCUMENTS

JP    HEI 4 309-566    11/1992

* cited by examiner

*Primary Examiner*—Mark L. Bell
*Assistant Examiner*—Shalie Manlove
(74) *Attorney, Agent, or Firm*—Carlos Nieves; David Mitchell Goodrich

(57) ABSTRACT

A composite pigment is provided with the composite pigment including a dense inorganic material and silica. The pigment composition is characterized by a CTAB surface area of greater than about 20 $m^2/g$; a BET surface area of greater than about 15 $m^2/g$; and a density of greater than about 2.5 $g/cm^3$.

21 Claims, No Drawings

COMPOSITE PIGMENT COMPOSITION CONTAINING SILICA

BACKGROUND OF THE INVENTION

Fillers are a widely-used component in most polymeric materials in which they perform a variety of functions, such as reinforcing physical strength properties, improving the processability of the polymer and reducing cost. Conventionally, carbon black is the most widely used filler in elastomer or rubber compositions, particularly those compositions used to form tires, because it provides the most improved strengthening and durability performance, while also improving road traction and processibility of the rubber material during manufacture.

However, while offering these advantages, the use of carbon black filler also increases the hysteresis of a rubber or elastomer compound, and may thus adversely affect the tire performance properties related to hysteresis when used as the material to form a tire tread. In the specific case of tires, the hysteresis of a tire tread affects traction (both wet and dry), rolling resistance (which relates to fuel efficiency), and heat generation (higher heat generated during service can reduce the durability of the tire tread). Because of this and other disadvantages associated with the use of carbon black, there is a need in the art for alternative filler materials for use in rubber and elastomer compositions.

One filler material that has been proposed as an alternative to carbon black is silica. When silica is combined with a coupling agent (coupling agents provide connective adhesion between the silica filler and the polymer chains of the rubber), it becomes coupled silica, which offers advantages compared to conventional fillers. For example, tire treads made from coupled silica-containing rubber have strength and durability properties comparable to tire treads made from carbon black-containing rubber. Indeed, the use of coupled silica filler provides certain benefits over conventional fillers, notably the use of coupled silica enhances the hysteresis-related properties such as increasing the wet traction, lowering the rolling resistance (and thereby improving fuel efficiency) and lowering the heat generated during service (and thereby improving the tire durability).

However, the use of coupled silica in rubber and elastomer compositions also presents certain disadvantages. Combining silica with coupling agents complicates the mixing process and manufacture. In particular, the manufacture is delayed because sufficient time must pass to allow for the completion of the reaction between the coupling agents, the polymer chains and the silica. Additionally, the reaction of silane coupling agents leads to ethanol emissions. Because ethanol emissions into the atmosphere are strictly regulated, manufacturing facilities using silane coupling agents must be equipped with equipment to control such emissions, further increasing costs.

Still other alternative fillers for rubber compositions have been proposed, but these alternative filler materials are not themselves without disadvantages. For example, while not an acceptable substitute on its own for carbon black, it has been suggested that a portion of carbon black filler in an elastomer or rubber composition could be replaced with barium sulfate. Barium sulfate's density would seem to make it an ideal filler (when blended with carbon black) in rubber compositions intended for use in making tires, because important tire performance characteristics such as rolling resistance and traction performance are related to the average density of the filler materials. However, because barium sulfate has neither sufficient surface area nor sufficient surface chemistry to interact with the rubber matrix, the barium sulfate fails to provide any reinforcement benefits, so that barium sulfate filler-containing rubber compositions do not provide sufficient abrasion resistance to be made into tire treads.

Given the foregoing, there is a continuing need for new filler materials for use in rubber compositions that can be formed into a tire with excellent performance characteristics. Such filler materials should be capable of being easily incorporated into a rubber composition without complicating or slowing down the manufacturing process. Additionally, such fillers should preferably reduce the amount of additional chemical compounds, like coupling agents, that are necessary for producing tires having satisfactory performance standards.

BRIEF SUMMARY OF THE INVENTION

The invention includes a composite pigment composition comprising silica and a dense inorganic material. This composite pigment composition has a CTAB surface area of greater than about 20 $m^2/g$; a BET surface area of greater than about 15 $m^2/g$; and a density of greater than about 2.5 $g/cm^3$.

The invention also includes a composite pigment composition comprising about 5 wt % to about 70 wt % silica, and about 30 wt % to about 95 wt % barium sulfate. The composite pigment composition has: a CTAB surface area of greater than about 20 $m^2/g$; a BET surface area of greater than about 15 $m^2/g$; a density of greater than about 2.5 $g/cm^3$; and an oil absorption of about 30 cc/100 g to about 150 cc/100 g.

The invention also includes a method for increasing the functionality of inorganic particles. This method comprises the steps of providing inorganic particles and depositing precipitated amorphous silica on the inorganic particles to increase the functionality of the inorganic particles.

DETAILED DESCRIPTION OF THE INVENTION

All parts, percentages and ratios used herein are expressed by weight unless otherwise specified. All documents cited herein are incorporated by reference. The following describes preferred embodiments of the present invention, which provides a silica-containing composite pigment composition for use in rubber, such as rubber compositions from which tires are prepared. While the optimal use for these composite pigments is in tires, these composite pigments may also be used in a variety of other industrial and consumer products, including general rubber goods, such as belts, hoses, motor mounts, shoe soles, paints and other such goods.

By "coated" it is meant that the specified coating ingredient covers at least a portion of the outer surface of a particle or substrate.

By "slurry" it is meant an aqueous mixture of water and at least one other component, wherein water forms the continuous phase.

By "mixture" it is meant any combination of two or more substances, in the form of, for example without intending to be limiting, a heterogeneous mixture, a suspension, a solution, a sol, a gel, a dispersion, or an emulsion.

The present invention relates to a composite pigment material that includes an inorganic material and precipitated amorphous silica. This composite pigment material is especially useful as a filler in rubber compositions for use in making tires. Preferably, the silica is deposited as a coating on a substrate (or "core") of the inorganic material. When so deposited, the silica forms in agglomerations around the inner core or substrate creating an irregular surface profile, which has a high porosity and accordingly a very high surface area.

Tires incorporating a blend of this composite pigment material and carbon black have excellent strength properties that are comparable or even superior to tires with conventional carbon black or silane coupled silica filler rubber compounds. Without being limited by theory, it is believed that this excellent strength performance is obtained by including precipitated amorphous silica, which can react with coupling agents, on the surface of a high-density inorganic core material.

It is believed that the density of an elastomer filler is related to the resulting rolling resistance of a tire through polymer-filled energy transfer during dynamic deformation. Carbon black is less dense than silica, which is less dense than the inventive composite material. The inventive composite material reacts with a coupling agent as does pure silica, but has a much greater density than pure silica. This means that rubber compositions incorporating this composite pigment have improved wet traction or rolling resistance when used alone or equal rolling resistance to a rubber composition containing conventional fillers when used in combination with carbon black.

Because of the hydroxyl groups located throughout the high surface area silica coating, a sufficiently high level of crosslinking is formed between the elastomer, the silane coupling agent and the silica coating, so that a rubber composition containing the present composite pigment material has strength properties comparable or superior to rubber compositions containing fillers such as uncoated barium sulfate and dense-phase silica coated barium sulfate. On a weight basis, the composite pigment material of the present invention requires less coupling agent compound than a less dense filler. The improvement in the reinforcing properties obtained by using a high density filler (like the present composite pigment filler) allows for the formulation of a filler blend made from a combination of the present composite material, and carbon black, which offers comparable or superior wet traction performance, rolling resistance, and abrasion resistance (tire wear) than that obtained with silane coupled silica while at the same time reducing manufacturing costs associated with the use of silane coupled silica.

Additionally, the inorganic material used in the present invention has a sufficient density so that rubber compositions containing this filler can be made into tires that have enhanced rolling resistance and wet traction characteristics.

Thus, in the present invention, the composite pigment material has a silica coating that provides a high level of hydroxyl functionality to form cross-links with a coupling agent and the rubber matrix. Accordingly, the present invention also relates to a method for increasing the functionality of inorganic material. In this method, particles of the inorganic material are provided, and precipitated amorphous silica is deposited on the inorganic particles to increase the functionality of the inorganic particles.

This method to increase the functionality of inorganic materials by combining the aforementioned inorganic material and silica ingredients to form a composite pigment filler will now be discussed in greater detail. Subsequently, the ingredients themselves will be discussed in greater detail.

The method of preparing the inventive material involves first mixing together in a reactor an aqueous solution of an alkali metal silicate, such as sodium silicate, and optionally an alkali metal sulfate, such as sodium sulfate. Any suitable reactor equipped with mixing means adequate to ensure a homogeneous mixture may be used. The aqueous solution of an alkali metal silicate preferably has a concentration of about 1 wt % to about 30 wt %, such as between about 10 wt % to about 30 wt %. The aqueous solution of an alkali metal sulfate preferably has a concentration of about 1 wt % to about 5 wt %.

The reactor is then heated to a temperature of between 60° C. and 95° C., preferably between 70° C. and 85° C. under constant stirring, after which the dense inorganic material (preferably in solid, particulate form) is added directly to the silicate/sulfate reactor batch to form a reactor mixture. The amount of inorganic material added at this step depends on the desired concentrations of silica and inorganic material in the composite pigment.

After the inorganic material is added, the reactor mixture is stirred for a period of time, of at least 5 minutes to fully disperse the inorganic material. After the stirring, an aqueous solution of acidulating agent or acid is then added to the reactor mixture, at a relatively constant rate until a first pH level of 6.5–10, such as a pH of 7.0 to 7.8 was reached.

The aqueous acidulating agent solution preferably has a concentration of acidulating agent of about 6 wt % to about 35 wt %, such as about 9.0 wt % to about 15 wt %. Suitable acidulating agents or acids include $H_2SO_4$, $H_3PO_4$, $HNO_3$, HCl, $HCO_2H$, $CH_3CO_2H$; sulfuric acid is preferred.

After the reactor mixture reaches its first pH level, the addition of the aqueous acidulating agent solution is stopped, and the reactor mixture heated to a temperature of between 83° C. and 95° C., preferably between 90° C. and 94° C. Alternately, a recirculating loop and recirculating pump can be utilized. In such cases, the recirculating loop is opened and the pump is turned on after a specified time measured from the beginning of acid addition, such as 5 to 15 minutes, such as 8 to 12 minutes. The mixing rate is decreased. When the reaction mixture reaches pH 8.5 to 9.0, the reaction mixture temperature is ramped up to the final reaction temperature of between 83° C. and 95° C., preferably between 90° C. and 94° C.

After reaching this temperature, there is a simultaneous addition of an acidulating agent and an alkali metal silicate. During this simultaneous addition, the rate of acid addition was adjusted to maintain the pH within the range of 7.4–7.6, while the silicate addition rate was maintained constant. The silicate addition is discontinued after about 0 minutes to about 60 minutes, such as about 30 minutes, but the acid addition continues until the reaction mixture reaches a pH of between 4.5 to 6.5, such as about 5.8 to 6.2, such as about 6.0. The reaction mixtures then digests for about 0 minutes to about 60 minutes, after which the pH is readjusted to a range of between 4.5 to 6.5, such as about 5.8 to 6.2, such as about 6.0.

After the completion of digestion, the reaction batch is filtered and washed with water to remove excess inorganic salts until the wash water from the composite pigment filter cake obtains a conductivity of less than about 3000$\mu$ siemens. Because the conductivity of the composite pigment filtrate is proportional to the inorganic salt by-product concentration in the filter cake, by maintaining the conductivity of the filtrate to be less than 3000$\mu$ siemens it can be ensured that the concentration of inorganic salts, such as $Na_2SO_4$, in the filter cake is not above 2.0 wt %.

The composite pigment filter cake is slurried in water, and then dried by any conventional drying techniques, such as spray drying, to produce a composite material containing from about 3 wt % to about 15 wt % of moisture. The composite material may then, optionally, be milled to obtain the desired particle size.

The composite pigment material can then, if desired, be placed in a low dust/readily dispersible form by any forming process such as granulation, pelletization, and/or other known forming means. A granulation process is preferred where the composite pigment material is compressed into compacted bodies, the bodies then being broken into smaller particles. The fine fraction of the smaller particles is then recovered and mixed with more composite material, and that mixture is compressed into denser compacted bodies. The denser compacted bodies are then broken-up and screened to the desired size to form the granulated product. A vacuum may be applied during various points in the process to aid in the densification. Spray dried composite material can be milled prior to granulation. These forming procedures can be accomplished with or without the aid of other product forming agents.

The composite pigment filler material prepared according to present invention as described above comprises about 5 wt % to about 70 wt % silica, and about 30 wt % to about 95 wt % inorganic material, preferably about 30 wt % to about 50 wt % silica, and about 50 wt % to about 70 wt % inorganic material. The CTAB surface area of the composite pigment is greater than about 20 m$^2$/g, and the BET surface area of the composite pigment will be greater than about 15 m$^2$/g, such as greater than about 25 m$^2$/g. Preferably the BET surface area is about 100% to about 120% the CTAB surface area. The oil absorption of the composite pigment is about 30 cc/100 g to about 150 cc/100 g. The composite pigment has a density of about 2.5 g/cm$^3$ to about 4.9 g/cm$^3$.

The inorganic material used in the present invention may be selected from several different species of inorganic material. Preferred inorganic materials include water-insoluble metals, metal oxides, sulfates and silicates with a density greater than 2.5 g/cm$^3$, such as zinc, barium sulfate, zinc sulfate, sodium aluminosilicate, copper sulfide, tungsten oxide, and zinc oxide. Suitable specimens of sodium aluminosilicate include those sold under the tradename Zeolex® by the J.M. Huber Corporation, Edison, N.J. Suitable specimens of zinc oxide include those sold under the tradename Kadox® available from the Zinc Corporation of America, Monaca, Pa.

The barium sulfite is preferably a ground, dry, naturally occurring barium sulfate or alternatively a precipitated barium sulfate. Suitable ground barium sulfates are sold, in many different grades, under the tradename Huberbrite® by the J.M. Huber Corporation. These ground barium sulfates are particularly preferred because of their small particle size. They are available in several different grades, the typical properties of a preferred ground barium sulfate is set forth below in Table I. Suitable precipitated barium sulfates are sold under the name Blanc Fixe by Sachtleben Chemie GmbH, Duisberg, Germany, and the typical properties of one such precipitated barium sulfate is set forth below in Table I.

TABLE I

Typical Properties of Preferred Barium Sulfates

|  | Huberbrite 1 | Blanc Fixe |
| --- | --- | --- |
| Moisture, 105° C., % | 0.10 | 0.1 |
| Median Particle Size, μm | 1.0 | 0.76 |
| % Particle size < 3 μm | 91 | 99.3 |
| % Particle size < 1 μm | 48 | 66.9 |
| pH, 5% | 9.4 | 9.1 |
| CTAB, m2/g | 2 | 3 |
| BET, m2/g | 3 | 5 |

The barium sulfates used herein may optionally be modified by a polymer surface treatment. A suitable polymer treatment includes treatment with a silicone-hydride containing polysiloxane, which contain silicon hydride groups that are particularly effective at surface treatment. By performing this polymer treatment step, the wetability and dispersibility of barium sulfates in polymeric compounds is increased, thus reducing the processing time to add these compounds to polymers. Further, the tendency of these fine-particle size barium sulfates to cake is additionally reduced by such treatment. Treatment of the barium sulfates with a silicone-hydride containing polysiloxane is discussed in greater detail in U.S. Pat. No. 6,194,070 B1.

The invention will now be described in more detail with respect to the following, specific, non-limiting examples.

EXAMPLES 1–5

In Examples 1–5, composite pigment materials comprising a high-density core and a silica coating were prepared in accordance with the present invention. The quantities of reactants and the reactant conditions are set forth in Table II, below. First an aqueous solution of 1.5 wt % Na$_2$SO$_4$ was added to an aqueous solution of Na$_2$OSiO$_2$ (molar ratio 3.3) in a reactor equipped with a mechanical stirrer and a heating device (preferably steam heated). Thereafter the reactor contents were heated to an initial temperature with constant stirring at 400 rpm after which a specified amount of a dense inorganic core material was added to the reactor.

Stirring was continued for another 5 minutes to disperse the dense inorganic core material. Thereafter, a solution of H$_2$SO$_4$ was then added at a specified rate until pH 7.5 was reached. If a recirculation loop was used, the loop was opened and the pump turned on at a specified time measured from the beginning of acid addition. The stirring rate was then reduced to 300 rpm. When the pH reached 8.8, the reaction temperature was ramped to the second reaction temperature. In the case where no recirculation was used, the acid addition was stopped when the pH reached 7.5 and the temperature then increased to a second reaction temperature. In both cases, there was a co-addition of sulfuric acid and sodium silicate at specified rates after the reaction mixture reached the second reaction temperature. The rate of acid addition was adjusted in order to maintain the pH within the range of 7.4–7.6; the silicate addition rate was maintained constant. The silicate addition was terminated after 30 minutes, while the acid addition continued thereafter at a final acid rate until a pH of 6.0 was reached. The reaction mixture was allowed to digest for 10 minutes at the second reaction temperature with stirring, after which the pH was readjusted to 6.0. The slurry was filtered using a rotary vacuum filter or a plate and frame filter and washed to conductivity of less than 3000μ siemens or less than 2.0 wt % sodium sulfate. Thereafter the product was oven dried or spray dried at 10% solids to obtain a final composite pigment material that contained a silica coating and a dense inorganic core.

The quantities of the reactants added and the reactant conditions are as follows:

TABLE II

|  | Example 1 | Example 2 | Example 3 | Example 4 | Example 5 |
|---|---|---|---|---|---|
| Initial volume $Na_2SO_4$ solution, L | 9.6 | 16 | 9.6 | 0.90 | 9.6 |
| Sodium silicate conc., wt. % | 24.7 | 24.7 | 24.7 | 11.0 | 24.7 |
| Initial vol. sodium silicate soln., L | 6.0 | 10 | 6.0 | 1.5 | 5.0 |
| Initial reaction temperature, °C. | 84 | 84 | 79 | 72 | 79 |
| Inorganic core material | $BaSO_4$ | $BaSO_4$ | $BaSO_4$ | $BaSO_4$ | ZnO |
| Wt. Inorganic core, kg | 9.4 | 6.47 | 3.46 | 0.167 | 4.545 |
| $H_2SO_4$ conc., wt. % | 11.4 | 11.4 | 11.4 | 11.5 | 11.4 |
| $H_2SO_4$ addition rate, ml/min | 374 | 290 | 274 | 41 | 220 |
| Recirculation pump started, min. | 8 | N/A | 12 | N/A | 12 |
| Second reaction temp., °C. | 93 | 93 | 93 | 93 | 93 |
| Acid co-addition rate, ml/min | 33–45 | 55 | 33–45 | 4.02 | 33–45 |
| Silicate co-addition rate, ml/min | 40.2 | 67 | 40.2 | 8.2 | 40.2 |
| Final acid addition rate, ml/min | 33 | 50 | 33 | 4.02 | 33 |

COMPARATIVE EXAMPLE 1

In Comparative Example 1 a prior art filler material, viz. a "dense phase silica" coated barium sulfate, was prepared. In this example, the silica coating is formed as a thin coating layer around the surface of barium sulfate particles. Because the coating layer is in this thin, adhering form, the overall silica/barium sulfate particle still has the same recognizable shape as that of the barium sulfate core, before the silica application. These dense phase silica coated inorganic particles have a relatively low surface area.

In this specific example the dense phase silica coated barium sulfate core was prepared by first mixing 58.5 L of water with 6.5 kg of barium sulfate (Huberbrite 1, in a 10% slurry) in an atmospheric reactor equipped with a mechanical stirrer and a heating device. The reactor was subsequently heated to 90° C. with stirring at 400 rpm. Then a solution of 11.4 wt % sulfuric acid and a solution of 13.3 wt % sodium silicate (3.3 molar ratio) were simultaneously added to the reactor at rates of 104 ml/min and 338 ml/min, respectively. During the addition of the sulfuric acid and sodium silicate, the pH was maintained at 9.0±0.2 by slightly adjusting the rate of acid addition (and keeping the rate of silicate addition constant). The silicate addition was terminated after 30 minutes while the acid addition continued until the pH was 5.5±0.1. The resulting product was filtered immediately and washed to a conductivity of less than 3000 siemens or less than 2.0 wt % sodium sulfate. Thereafter the final product was reslurried to 10% solids and spray dried to obtain a prior art filler material that contained 15 wt % dense-phase silica and 85 wt % barium sulfate.

COMPARATIVE EXAMPLE 2

In Comparative Example 2 the prior art filler material prepared according to Comparative Example 1, was given an additional coating of silica, as follows. First, 5 kg of the product of Comparative Example 1 was added to 45 liters of water in a reactor equipped with a mechanical stirrer and a heating device and then stirred at 400 rpm for 5 minutes to disperse the solids. The mixture was subsequently heated to 90° C. with constant stirring at 400 rpm. Sulfuric acid (at a concentration of 11.4 wt %) and sodium silicate (3.3 mole ratio at a concentration of 13.3 wt %) were then simultaneously introduced to the heated reaction mixture at a rate of 80 ml/min and 260 ml/min, respectively. During the co-addition, the pH was maintained at 9.0±0.2 by adjusting the acid rate while keeping the silicate rate constant.

The silicate addition was terminated after 30 minutes and the acid addition was continued to a pH of 5.5. Thereafter the product was filtered and washed to a conductivity of less than $3000\mu$ siemens or less than 2.0 wt % sulfate and then subsequently reslurried to 10% solids and spay dried. The resulting product contained 30% dense-phase silica coating and 70% barium sulfate core.

COMPARATIVE EXAMPLE 3

In this Comparative Example, example 1 of Japanese patent HEI4[1992]-309566 was reproduced. In this example, barium sulfate is first precipitated, then a silica coating is deposited onto the barium sulfate core. In the first stage, 197.4 g $BaCl_2$ was added to 1 liter of water. In a separate container, 50.5 g $H_2SO_4$ was mixed into 1 liter of water to make a 0.5 molar acid solution. The barium chloride was added drop-wise at a rate of 50 ml/min to the acid solution for 10 minutes, while mixing at 400 rpm. The resulting barium sulfate slurry was stirred for an additional 3 minutes, then cooled to room temperature, filtered, water washed and dried at 105° C. for 2 hours. The second stage of the process involved dispersing 10 g of the stage one resultant barium sulfate in 500 ml water containing 38 wt. % (3.3 mole ratio) sodium silicate, Thereafter 300 ml of 2 N nitric acid was added at a rate of 5 ml/min for 60 minutes. The resulting silica coated barium sulfate was recovered by filtration, washing and drying.

The CTAB surface area, BET surface area, oil absorption, density, and particle size of the Composite Pigment filler material prepared in Examples 1–5, and Comparative Examples 1–3 were measured, and the values obtained from the measurements set forth below in Tables III and IV. The measurement methods are as follows.

The oil absorption properties shown in table II (and throughout this application) were measured with the rubout method. In this test, oil is mixed with the composite material and rubbed with a spatula on a smooth surface until a stiff putty-like paste is formed. By measuring the quantity of oil required to have a paste mixture, which will curl when spread out, one can calculate the oil absorption value of the metasilicate, the value which represents the volume of oil required per unit weight of the composite material to completely saturate the metasilicate absorptive capacity. Calculation of the oil absorption value was done according to equation (I):

$$\text{Oil absorption} = \frac{\text{ml oil absorbed}}{\text{weight of composite, grams}} \times 100 \quad (I)$$

$$= \text{ml oil}/100 \text{ gram composite}$$

Particle size is determined using a Model LA-910 laser light scattering instrument available from Horiba Instruments, Boothwyn, Pa. A laser beam is projected through a transparent cell which contains a stream of moving particles suspended in a liquid. Light rays which strike the particles are scattered through angles which are inversely proportional to their sizes. The photodetector array measures the quantity of light at several predetermined angles. Electrical signals proportional to the measured light flux values are then processed by a microcomputer system to form a multi-channel histogram of the particle size distribution.

CTAB external surface area of composite material is determined by absorption of CTAB (cetyltrimethylammonium bromide) on the pigment or composite surface, the excess separated by centrifugation and determined by titration with sodium lauryl sulfate using a surfactant electrode. The external surface of the composite material is determined from the quantity of CTAB adsorbed (analysis of CTAB before and after adsorption). Specifically, about 0.5 g of composite material is placed in a 250-ml beaker with 100.00 ml CTAB solution (5.5 g/L), mixed on an electric stir plate for 1 hour, then centrifuged for 30 minutes at 10,000 rpm. One ml of 10% Triton X-100 is added to 5 ml of the clear supernatant in a 100-ml beaker. The pH is adjusted to 3.0–3.5 with 0.1 N HCl and the specimen is titrated with 0.0100 M sodium lauryl sulfate using a surfactant electrode (Brinkmann SUR1501-DL) to determine the endpoint.

The Gemini III 2375 Surface Area Analyzer (from Micromeritics Corporation) is used to determine the BET surface area of solid materials. It uses a technique in which the analysis gas (nitrogen) is metered simultaneously into a tube containing the sample and into a blank balance tube. The internal volume and the temperature surrounding both tubes are maintained at identical conditions, with the only difference being the presence of sample in the sample tube.

The sample and balance tubes are immersed in a single liquid nitrogen bath, which maintains isothermal conditions for both tubes. Metering of the analysis gas is delivered to both the balance and sample tubes through separate servo valves. A differential pressure transducer measures the pressure imbalance between both tubes, which is caused by the adsorption of the gas onto the sample. As the sample adsorbs analysis gas, the servo valve maintains the pressure balance between the two tubes by admitting more gas into the sample tube. The end result is that the Gemini maintains a constant pressure of the analysis gas over the sample while varying the rate of analysis gas delivery to match the rate at which the sample can adsorb the gas. The rate at which the sample absorbs the gas can be correlated to the surface area of the sample.

In the present experiments, the BET was measured as follows. A 0.34 to 0.36 g sample was predried for 2 hours at 105° C. and degassed for 1 hour at 160° C. Micromeritics Flow Prep 060 nitrogen degassing unit was utilized, using the vacuum prep method described in the instrument manual. The evacuation rate is 300 mm Hg/min for 1 minute. The analysis mode used is an "equilibrate" with a 5-second equilibration time. Free space is measured employing helium as the free space gas. Five (5) points are measured between 0.05 and 0.20 P/Po.

The density of the composite material is calculated from the weight percent of silica at density 2.2 g/ml and the weight percent barium sulfate at density of 4.5 g/ml. For example, the density of a composite of 50% silica and 50% barium sulfate is (0.5×2.2)+(0.5×4.5)=3.35 g/ml. The results of these measurements and tests are given below in Table III (for composite pigment materials prepared according to the present invention) and Table IV (for composite pigment material prepared according to the prior art).

TABLE III

Properties of Composite Pigment Materials Prepared According to the Present Invention

|  | Example 1 | Example 2 | Example 3 | Example 4 | Example 5 |
|---|---|---|---|---|---|
| Dense inorganic core | $BaSO_4$ | $BaSO_4$ | $BaSO_4$ | $BaSO_4$ | ZnO |
| Silica, Wt % | 15 | 30 | 32 | 50 | 24 |
| CTAB, m2/g | 22 | 38 | 52 | 129 | 22 |
| BET, m2/g | 17 | 43 | 48 | 153 | 27 |
| Oil absorption, ml/100 g | 48 | 71 | 88 | 130 | 51 |
| Median particle size, μm | 4.3 | 4.8 | 11.9 | 17.4 | 6.7 |
| Density, g/ml | 4.15 | 3.81 | 3.76 | 3.35 | 4.51 |
| 5% pH | 8.2 | 7.9 | 8.0 | 8.0 | 9.5 |

TABLE IV

Properties of Prior Art, Comparative Example Pigments

|  | Comparative Example 1 | Comparative Example 2 | Comparative Example 3 |
|---|---|---|---|
| Dense inorganic core | $BaSO_4$ | $BaSO_4$ | $BaSO_4$ |
| Silica, Wt % | 15 | 28 | 15 |
| CTAB, m2/g | 4 | 5 | 3 |
| BET, m2/g | 6 | 6 | 13 |
| Oil absorption, ml/100 g | 39 | 47 | 21 |
| Median particle size, μm | 3.4 | 7.2 | 0.4 |
| Density, g/ml | 4.14 | 3.97 | 4.25 |

As can be seen in table III, the composite pigment material prepared in Examples 1–5 met all the criteria for producing a filler that can be incorporated into a rubber composition, which when formed into a tire will have excellent strength properties, enhanced rolling resistance and wet traction characteristics. By contrast, the material of comparative examples 1–3 as shown in table IV, has a low surface area, which means that when the composite pigment is added as a filler to a rubber composition there will be a low level of cross-linking formed between the filler and the coupling agents in the rubber composition; thus the rubber compositions will have insufficient strength properties to be made into a tire.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A composite pigment composition comprising silica and a dense inorganic material, wherein the pigment composition has:
    a CTAB surface area of greater than about 20 $m^2/g$;
    a BET surface area of greater than about 15 $m^2/g$; and
    the dense inorganic material has a density of greater than about 2.5 $g/cm^3$.

2. The pigment composition of claim 1, wherein the dense inorganic material is barium sulfate.

3. The pigment composition of claim 2, wherein the pigment composition comprises about 5 wt % to about 70 wt % silica, and about 30 wt % to about 95 wt % barium sulfate, based on the total weight of the pigment composition.

4. The pigment composition of claim 1, wherein the pigment composition is in particulate form and has a particle size of less than about 100 microns.

5. The pigment composition of claim 1, wherein the pigment composition has a CTAB surface area of greater than about 50 m²/g.

6. The pigment composition of claim 2, wherein the barium sulfate is coated with precipitated amorphous silica.

7. The pigment composition of claim 1, wherein the pigment composition has a CTAB surface area of greater than about 100 m²/g.

8. The pigment composition of claim 1, wherein the pigment composition has an oil absorption of about 30 cm³/100 g to about 150 cm³/100 g.

9. The pigment composition of claim 1, wherein the pigment composition has a density of about 2.8 g/cm³ to about 4.9 g/cm³.

10. The pigment composition of claim 2, wherein the pigment composition comprises about 30 wt % to about 50 wt % silica, and about 50 wt % to about 70 wt % barium sulfate, based on the total weight of the pigment composition.

11. The pigment composition of claim 1, wherein the BET surface area is about 100% to about 120% of the CTAB surface area.

12. The pigment composition of claim 1, wherein the silica is precipitated amorphous silica.

13. The pigment composition of claim 1, wherein the dense inorganic material is selected from the group consisting of zinc, zinc sulfate, zinc oxide, tungsten oxide, sodium aluminosilicate, copper sulfide, and barium sulfate.

14. The pigment composition of claim 1, wherein the pigment composition has a particle size of less than about 20 microns.

15. The pigment composition of claim 2, wherein the precipitated amorphous silica is deposited onto particles of the barium sulfate.

16. The pigment composition of claim 1, wherein the BET surface area is about 100% to about 120% of the CTAB surface area.

17. A composite pigment composition comprising about 5 wt % to about 70 wt % silica, and about 30 wt % to about 95 wt % barium sulfate, wherein the composite pigment composition has:

a CTAB surface area of greater than about 20 m²/g;

a BET surface area of greater than about 15 m²/g;

an oil absorption of about 30 cc/100 g to about 150 cc/100 g; and a density of about 2.8 g/cm³ to about 4.9 g/cm³.

18. A method for increasing the functionality of inorganic particles comprising the steps of:

providing dense inorganic particles having a density of greater than about 2.5 g/cm³; and depositing precipitated amorphous silica on the inorganic particles in order to increase the functionality of the inorganic particles.

19. The method according to claim 18, wherein the inorganic particles comprise barium sulfate particles.

20. The method according to claim 18, wherein the CTAB surface area is increased.

21. The method according to claim 18, wherein composite pigment particles are formed by the depositing of precipitated amorphous silica on the inorganic particles, the composite pigment particles having a CTAB surface area of greater than about 20 m²/g, and a BET surface area of greater than about 15 m²/g.

* * * * *